US011354185B2

(12) United States Patent
Korotaev et al.

(10) Patent No.: US 11,354,185 B2
(45) Date of Patent: *Jun. 7, 2022

(54) PROACTIVE DISASTER RECOVERY BASED ON EXTERNAL EVENT MONITORING

(71) Applicant: Acronis International GmbH, Schaffhausen (CH)

(72) Inventors: Kirill Korotaev, Moscow (RU); Serguei Beloussov, Costa Del Sol (SG); Alexander Tormasov, Moscow (RU); Oleg Melnikov, Moscow (RU); Oleg Shaikhatarov, Moscow (RU); Stanistav Protasov, Schaffhausen (CH)

(73) Assignee: Acronis International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/008,727

(22) Filed: Sep. 1, 2020

(65) Prior Publication Data

US 2020/0401473 A1    Dec. 24, 2020

Related U.S. Application Data

(63) Continuation of application No. 16/196,099, filed on Nov. 20, 2018, now Pat. No. 10,795,758.

(51) Int. Cl.
  *G06F 11/07*    (2006.01)
(52) U.S. Cl.
  CPC ...... *G06F 11/0793* (2013.01); *G06F 11/0709* (2013.01); *G06F 11/079* (2013.01); *G06F 11/0751* (2013.01)

(58) Field of Classification Search
  CPC ............. G06F 11/0709; G06F 11/0751; G06F 11/079; G06F 11/0793
  USPC ........................................................ 714/4.11
  See application file for complete search history.

(56) References Cited

U.S. PATENT DOCUMENTS

| 10,573,147 | B1 * | 2/2020 | Mousavi | G08B 21/02 |
| 10,613,962 | B1 * | 4/2020 | Delange | G06F 11/3006 |
| 2007/0136541 | A1 * | 6/2007 | Herz | G06F 11/1464 711/162 |
| 2009/0024713 | A1 * | 1/2009 | Strasenburgh | G06F 9/4856 709/208 |
| 2011/0320834 | A1 * | 12/2011 | Ingels | G06F 1/266 713/310 |
| 2012/0275610 | A1 * | 11/2012 | Lambert | G10K 11/16 381/56 |
| 2014/0215260 | A1 * | 7/2014 | Lim | G06F 11/2097 714/4.11 |

(Continued)

FOREIGN PATENT DOCUMENTS

| JP | 2016173782 | A | * | 9/2016 | | |
| KR | 2023465 | B1 | * | 9/2019 | ............. | G06Q 50/10 |
| KR | 2030006 | B1 | * | 11/2019 | ........... | A62C 3/0221 |

*Primary Examiner* — Chae M Ko
(74) *Attorney, Agent, or Firm* — ArentFox Schiff LLP; Michael Fainberg (57) ABSTRACT

Disclosed are systems and methods for proactive disaster recovery. The described technique monitors for events raised by a system of interconnected external sensors and other devices for obtaining data on the external environment of servers. The system uses these events as a chain of triggers according to which preventative or preparatory actions for disaster recovery are performed.

20 Claims, 5 Drawing Sheets

(56) References Cited

U.S. PATENT DOCUMENTS

| | | | | |
|---|---|---|---|---|
| 2016/0178440 A1* | 6/2016 | Uno | ........................ | G01K 11/12 |
| | | | | 356/43 |
| 2016/0217047 A1* | 7/2016 | Ignomirello | ............ | G06F 21/62 |
| 2016/0359872 A1* | 12/2016 | Yadav | .................. | H04L 63/1425 |
| 2017/0257389 A1* | 9/2017 | Cocchiara | ........... | H04L 41/5003 |
| 2017/0308802 A1* | 10/2017 | Ramsoy | ................. | G06N 20/10 |
| 2017/0366574 A1* | 12/2017 | Cocchiara | ............. | H04L 41/145 |
| 2018/0025299 A1* | 1/2018 | Kumar | .................. | G06F 3/0683 |
| | | | | 709/224 |
| 2018/0089042 A1* | 3/2018 | Demetriou | ............. | G06N 5/022 |
| 2018/0293587 A1* | 10/2018 | Oda | ........................ | G06Q 30/06 |
| 2019/0163588 A1* | 5/2019 | Anders | ............... | G06F 11/2066 |

\* cited by examiner

PROACTIVE DISASTER RECOVERY BASED ON EXTERNAL EVENT MONITORING

CROSS-REFERENCE TO RELATED APPLICATIONS

This application is a continuation and claims the benefit of U.S. Non-Provisional application Ser. No. 16/196,099, filed Nov. 20, 2018, which is herein incorporated by reference.

FIELD OF TECHNOLOGY

The present disclosure relates generally to the field of data backup and disaster recovery, more specifically, to systems and methods of performing proactive disaster recovery actions based on external event monitoring.

BACKGROUND

Disaster recovery is a field within computing relating to tools, policies, and procedures that enable recovery or continuation of vital technology, infrastructure, and systems. For example, a given disaster recovery policy may specify a recovery point objective (RPO), which is the maximum time period in which data might be lost from an information technology (IT) service due to a disruption or incident. A disaster recover policy may also specify a recovery time objective (RTO), which refers to a targeted duration of time and a service level within which a business or technological process must be restored after a disruption ("disaster") occurs in order to avoid unacceptable consequences associated with a break in business continuity.

However, using conventional tools, the time spent to recover backup data and resume operations with a significant amount of data could be huge. Recovery time can depend on a particular machine workload and on the target hardware configuration for scenarios when recovery is performed onto a different hardware platform having different types of hardware devices than the original computing hardware. A large portion of the recovery time can be spent on copying or preparing backups. Even if this recovery time may be on the order of several minutes, such a delay is still unacceptable for certain business-critical applications where the recovery time objective is high. Additionally, the efficiency of a disaster recovery process can strongly depend on how timely the actions for such recovery are performed. If such actions are delayed, there is an increased chance of data loss or an increased amount of data loss, which can be unacceptable for some critical computing systems.

In other words, there is a need in the art to minimize server downtime during backup, reduce data loss, and to provide a mechanism to rapidly recover a server after a failure or shutdown.

SUMMARY

Thus, a system and method is disclosed herein for proactive disaster recovery, and, more particularly, for proactively preparing for disaster recovery based on detected external events that may ultimately result in hardware and/or software failure. To build an efficient disaster recovery system, a system of interconnected external sensors and other devices for obtaining data on the external environment of computer servers is provided. The described system considers any events (external or digital) as a chain of triggers, according to which the system performs some disaster recovery preventative measures. Depending on the detected events, the described system performs disaster recovery steps according to an event escalation tree that defines an escalating sequence of events and corresponding actions for disaster recovery.

According to one aspect of the present disclosure, a computer-implemented method for proactive disaster recovery is provided. The method includes generating a first event based on first sensor data received from a first sensor, and determining whether the first event satisfies a first condition of an event escalation tree. The first sensor provides external data associated with an environment external to a first server disposed in a data center. The event escalation tree defines a sequence of events and associated actions of a disaster recovery process. The method further includes, responsive to determining that the first event satisfies the first condition of the event escalation tree, executing a corresponding action on the first server for preparing data stored on the first server for disaster recovery. The method includes, responsive to detecting a disaster recovery event, executing a remainder of the actions of the disaster recovery process.

In another aspect, the first sensor includes a sensing device configured to obtain environmental data indicative of the environment proximate to the first server.

In another aspect, the first sensor includes at least one of a temperature sensor, a carbon dioxide sensor, a humidity sensor, a motion sensor, a smoke detector, and a surveillance video camera.

In another aspect, the method further includes generating a second event based on network traffic detected by a network monitor.

In another aspect, the corresponding action includes moving data from a backup archive stored in a cold storage system to a virtual machine disk file stored on a hot storage system.

In another aspect, the corresponding action includes increasing a frequency of data backups of the server.

In another aspect, the corresponding action includes provisioning at least one virtual machine for use as a recovery virtual machine.

In another exemplary aspect of the present disclosure, a system for proactive disaster recovery is provided. The system includes a plurality of sensors including a first sensor configured to provide external data associated with an environment external to a first server disposed in a data center, and a hardware processor communicatively coupled to the plurality of sensors. The hardware processor is configured to generate a first event based on first sensor data received from the first sensor and determine whether the first event satisfies a first condition of an event escalation tree. The event escalation tree defines a sequence of events and associated actions of a disaster recovery process. The method further includes, responsive to determining that the first event satisfies the first condition of the event escalation tree, execute a corresponding action on the first server for preparing data stored on the first server for disaster recovery, and responsive to detecting a disaster recovery event, execute a remainder of the actions of the disaster recovery process.

According to another exemplary aspect, a computer-readable storage medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for proactive disaster recovery operations based on event monitoring. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
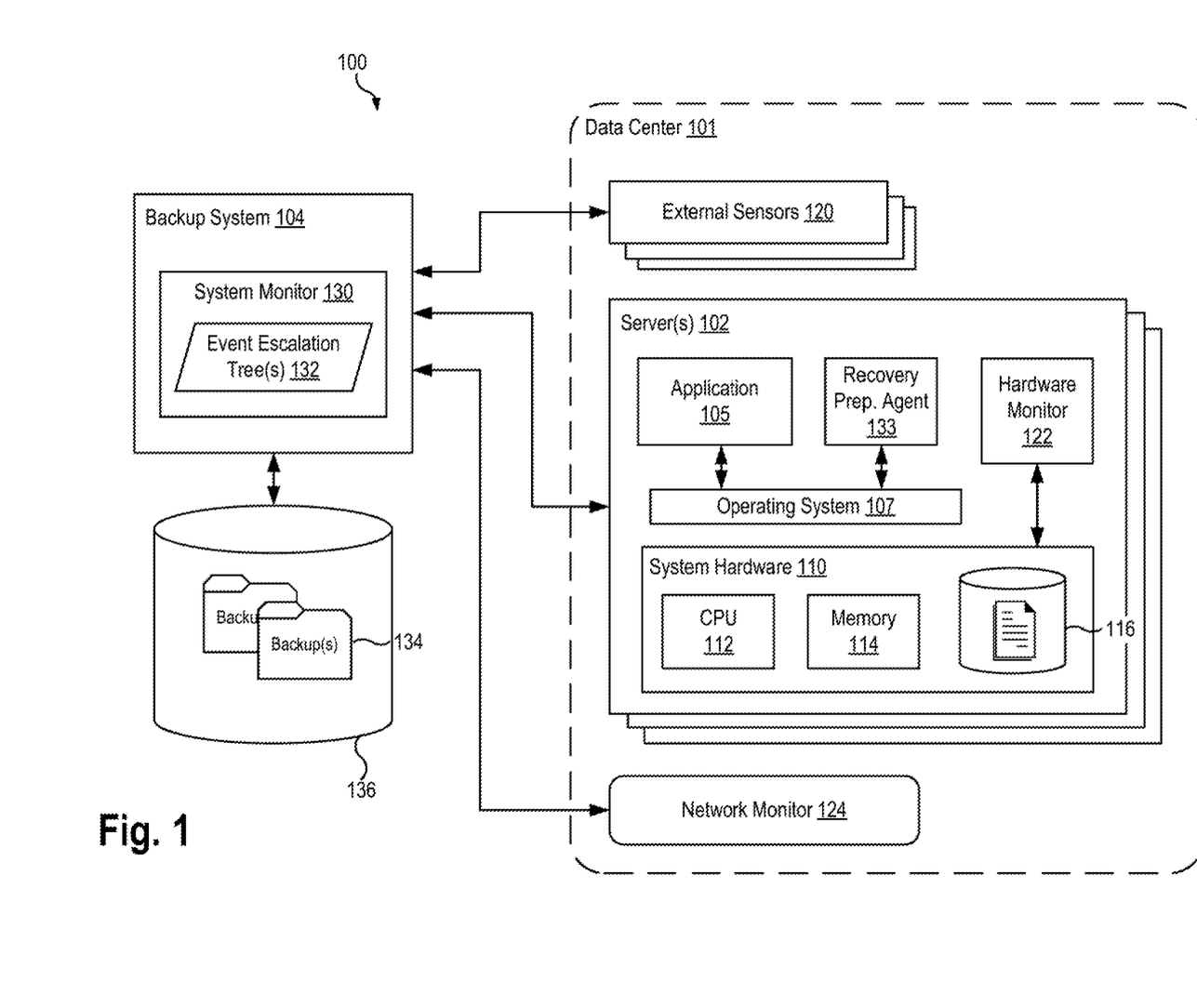
FIG. 1 is a block diagram illustrating a system for proactive disaster recovery according to an exemplary aspect.

FIG. 1 is a block diagram illustrating a system 100 for performing proactive disaster recovery operation based on external event monitoring according to an exemplary aspect. The system 100 includes a data center 101 having a plurality of servers 102 whose data is backed up by a backup system 104. The data center 101 may include a system of interconnected external sensors 120, hardware monitor(s) 122, network monitor(s) 124, and other devices configured to monitor the environment and status of the data center, as described in greater detail below. Examples of sensors 120 may include a temperature sensor, a carbon dioxide sensor, a humidity sensor, a motion sensor, a smoke detector, and a surveillance video camera. The server(s) 102 may be any physical server, computer server, host, desktop, laptop, handheld device, tablet device, smartphone, or other suitable computing devices. As shown, the system hardware 100 of a server can include at least one computer processing unit (CPU) 112, memory 114 (e.g., random access memory), and storage devices 116 (e.g., hard disk drives). The server 102 may include additional devices, software modules, and the like, as would be appreciated to one skilled in the art, but are not shown herein so as to not unnecessarily obscure the aspects of the disclosure.

In an aspect, the server(s) 102 may be executing a workload using at least one application 105 within an execution environment provided by an operating system 107. In some aspects, the application 105 may be designated as a "protected" application subject to a disaster recovery policy implemented by the backup system 104. The application 105 may include program data files of the application as well as user data associated with the application, which taken together represent an execution state of the application. For example, the application 105 may have a multi-tier software architecture in which data stored in a data layer of the multi-tier application is backed up by the backup system 104. In another example, the application 105 may be a virtual machine (VM) instance having one or more virtual disk files, which represent the state of the virtual machine, and which are backed up by the backup system 104. In some aspects, the entire server 102 itself is designated with a "protected" status, in which the backup system would then protect all processing performed by the server including the entire software stack of the server.

In an aspect, the backup system 104 is configured to store within a data store 136 a plurality of backups 134 of the one or more servers 102 in the data center 101. In some aspects, the backups 134 may be generated by the backup system 104 itself, or in other aspects, may be created by a recovery preparation agent 133 or local backup agent executing on the server 102. The backup system 104 may be any storage system having any number of storage servers or set of disks (e.g., hard disk drives), which are managed by software for archiving and storing data. Data store 136 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. In an aspect, the backup system 104 may be configured to perform a backup and archival procedure at the direction of a user (e.g., user input) or periodically according to a schedule determined by a disaster recovery policy. For example, in compliance with a policy specifying a RPO of 24 hours, the backup system 104 may be configured to create a full backup of each server 102 every day at 2:00 AM.

A backup 134 (also referred to herein as a backup archive) includes a copy of files, folders, data, meta-data, and/or information stored on a disk (of the computing device). In one aspect, a backup 134 may be a sector-by-sector copy of a disk, including a copy of the operating system 107, registry, drivers, data files of software applications 105, all files and folders (including hidden and system files), boot record, file allocation tables (FAT), and other system data. Such backups 134 may also be referred to as a disk image (which may further include a master boot record, or MBR) or a partition image. In some aspects, the backups 134 may be stored in a particular format for compression and/or packaging, such as a True Image Backup™ format (*.tib) made available by Acronis®, ISO images, VHD files, and other file formats. In some aspects, the backups 134 may be "full" backups having a replica of the entirety of a system disk, volume, partition, or other data storage of the server 102. In some cases, the backup system may generate incremental backups which contains all changes that have been made since the latest incremental or full backup was created. In other cases, the backup system may generate differential backups which contain all changes that have been after a full backup creation (i.e., cannot be chained to another differential or incremental backup). The backup system may generate a full backup based on a prior full backup and at least one incremental/differential backup by collapsing the backups into a single backup file.

The backup system 104 may be configured to perform disaster recovery or failover for any applications 105 or server 102 designated as "protected" according to a predetermined disaster recovery policy. The backup system 104 may include one or more backup servers for executing a recovered workload, when necessary. The backup servers may be designated prior to a failure or dynamically selected upon detection of a failure. In some aspects, the backup servers may be co-located with the servers 102 (e.g., in a same data center or site), located in a different data center or site, and/or are part of a cloud-based computing platform.

According to an aspect, the backup system 104 includes a system monitor 130 configured to monitor the environment of the data center 101 using the sensors 120, hardware monitors 122, network monitor 124, and other devices. The system monitor 130 may form one or more "external" events based on environmental data obtained from the sensors 120, hardware monitors 122, network monitor 124, and other devices. As used herein, the term external events refers to events related to the physical, ambient environment of the server, i.e., outside of the actual software execution of workloads within a server. The system monitor 130 is further configured to proactively prepare the backup data and backup servers for disaster recovery according to one or more event escalation tree(s) 132. In an aspect, the system monitor 130 may "proactively" execute one or more initial disaster recovery operations, i.e., prior to the complete and final determination that disaster recovery conditions have actually been met. An example event escalation tree is depicted in FIG. 2.

Figure 2:
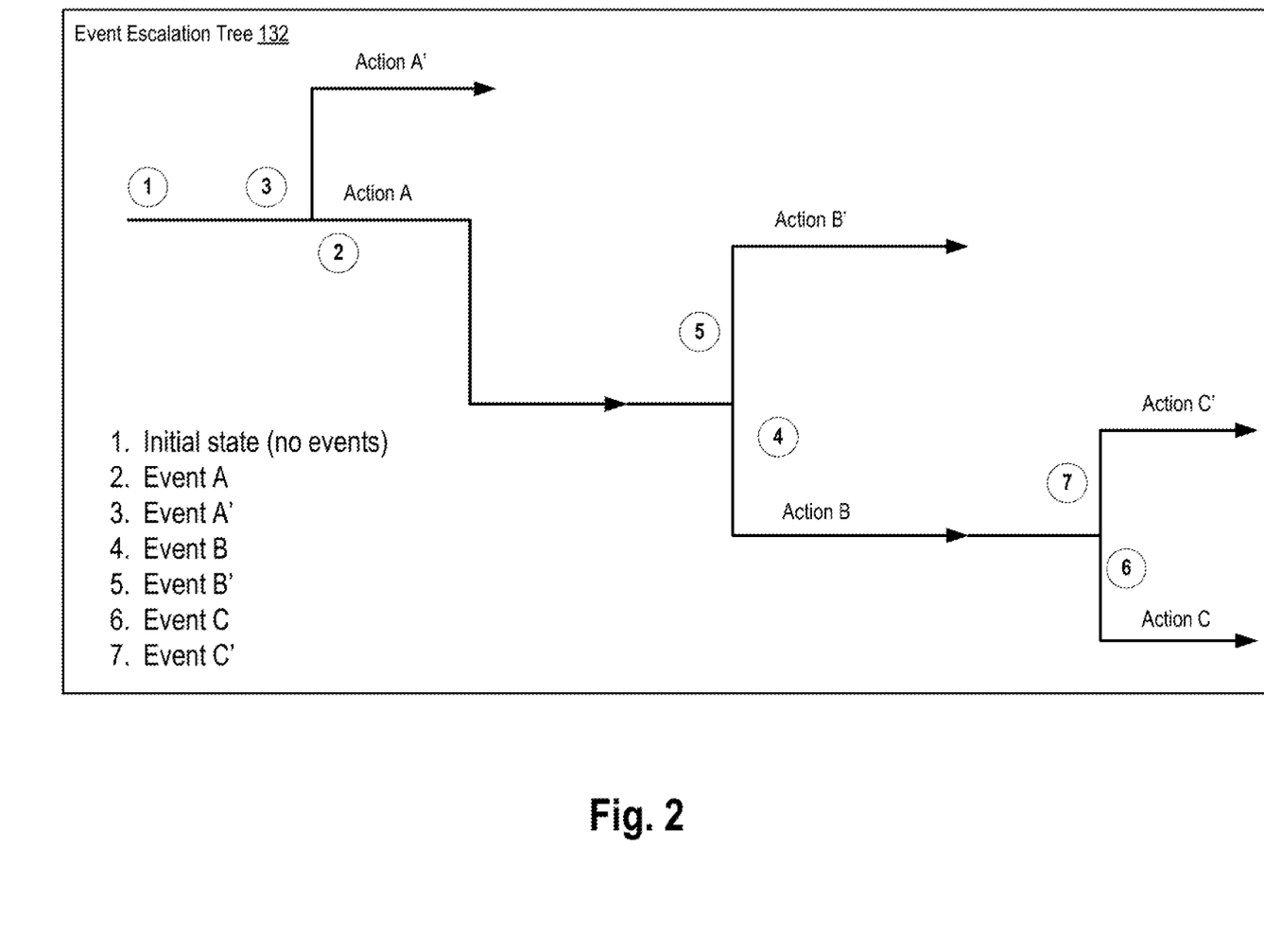
FIG. 2 is a diagram depicting an event escalation tree according to an exemplary aspect.

FIG. 2 is a diagram depicting an event escalation tree 132 according to an exemplary aspect. An event escalation tree 132 defines a sequence of external events and corresponding actions to be taken as part of disaster recovery plan and preparation. That is, the event escalation tree 132 encodes a predefined scenario of events in which disaster recovery will eventually be performed. The system monitor 130 enables the event escalation tree 132 to treat the external events as a chain of triggers according to which some disaster recovery preventive measures (i.e., actions) are performed at various points of escalation. In some aspects, each event has its own severity grade, as described in further detail below. The backup system performs the predefined steps (i.e., actions) depending on what event occurs (e.g., what type of event, what severity grade, other metadata associated with the event occurrence, or some combination thereof) as specified by the event escalation tree 132. In some aspects, the event escalation tree may be defined according to a service level agreement (SLA) associated with a customer. For example, a customer may make an agreement with a service provider (e.g., data center management company) regarding what should be done in different emergency situations (step-by-step actions) according to a particular event escalation tree.

Depending on the events raised, the backup system 104 performs the steps according to the escalation tree. For example, as shown in FIG. 2, if the system monitor detects that an Event "A" has occurred, then the backup system executes the corresponding disaster recovery operation or action "A". If another escalating Event "B" occurs, then the backup system performs the next disaster recovery operation or action "B". Any event may be followed by an escalated one, such as event related to smoke detection may be followed by an event related to a substantial increase in temperature. In other cases, an event may simply be followed by a subsequent, next event without an explicit escalation, such as an Event "A" occur followed by another Event "A".

In some aspects, the backup system may determine the severity grade associated with an event and perform actions specified by the event escalation tree 132 based on the determined severity grade. The severity grades may have a ranking or ordering characteristic, such as severity grades of "normal", "warning", "critical", in order of increasing severity. Severity grades may be assigned to events derived from one type of sensor. For example, an event formed from sensor data of a temperature sensor may be assigned a "warning" severity grade in response to a determination that the sensor data indicates a temperature reading that exceeds a first threshold value, or a "critical" severity grade in response to a determination that the sensor data indicates the temperature reading that exceeds a higher threshold value. The event escalation tree 132 may specify a certain action to be performed in response to detecting occurrence of an event of a particular type (e.g., temperature-related, environment-related, etc.), of a certain origin (e.g., from the temperature sensor), of a particular severity grade (e.g., "normal", "warning", "critical"), or some combination thereof. In this way, the event escalation tree 132 may be configured to handle situations in which a hot temperature within the data center indicates more cooling systems or air conditioning is required (i.e., warning-level severity), as well as situations which the temperature data indicates an incipient fire within or proximate to the data center (i.e., critical-level severity). In another example, an event formed from video surveillance data (e.g., cameras) that capture the appearance of an unfamiliar visitor at the entrance to the building in which the data center is housed may be assigned an initial level of danger or severity. Events formed from video surveillance data indicating the stranger enters or attempts to enter the server room or data center itself may be assigned a higher level of danger or severity grade.

In some aspects, the system may be further based on an AI or machine learning engine. The AI or machine learning engine allows for proactive disaster recovery based not only on predefined, known scenarios, but also based on newly analyzed situations according to training models. In one aspect, the event escalation tree 132 may be generated as the output of one or more machine learning models that have been trained using data sets of past event occurrences and sensor data. Such training data sets may include event information and sensor data from prior operations of a data center immediately prior to and during negative incidents which triggered disaster recovery procedures as well as event information and sensor data from prior operations of a data center during normal, expected operation. In an alternative aspect, the event escalation tree 132 itself may be implemented as a machine learning model that generates a prediction or characterization according to the events and sensor data that constitute input values to the machine learning model.

Using machine learning algorithms, aspects of the present disclosure can compare several different parameters of data obtained from other sources and analyze many combinations of these parameters. Even if individually each of these parameters does not seem to go beyond the limits of the norm, aspects of the present disclosure can determine when such parameters in combination with other events may portend some kind of danger for which proactive disaster recovery may be needed. For example, the machine learning model may identify that a combination of any external factors (wind, rain, hurricane) and internal events (system maintenance, equipment replacement, software updates) may be predictive of a critical-level danger, despite the fact that each individual event does not pose a threat. And based on this, the described backup system can take some additional measures on a proactive disaster recovery.

Figure 3:
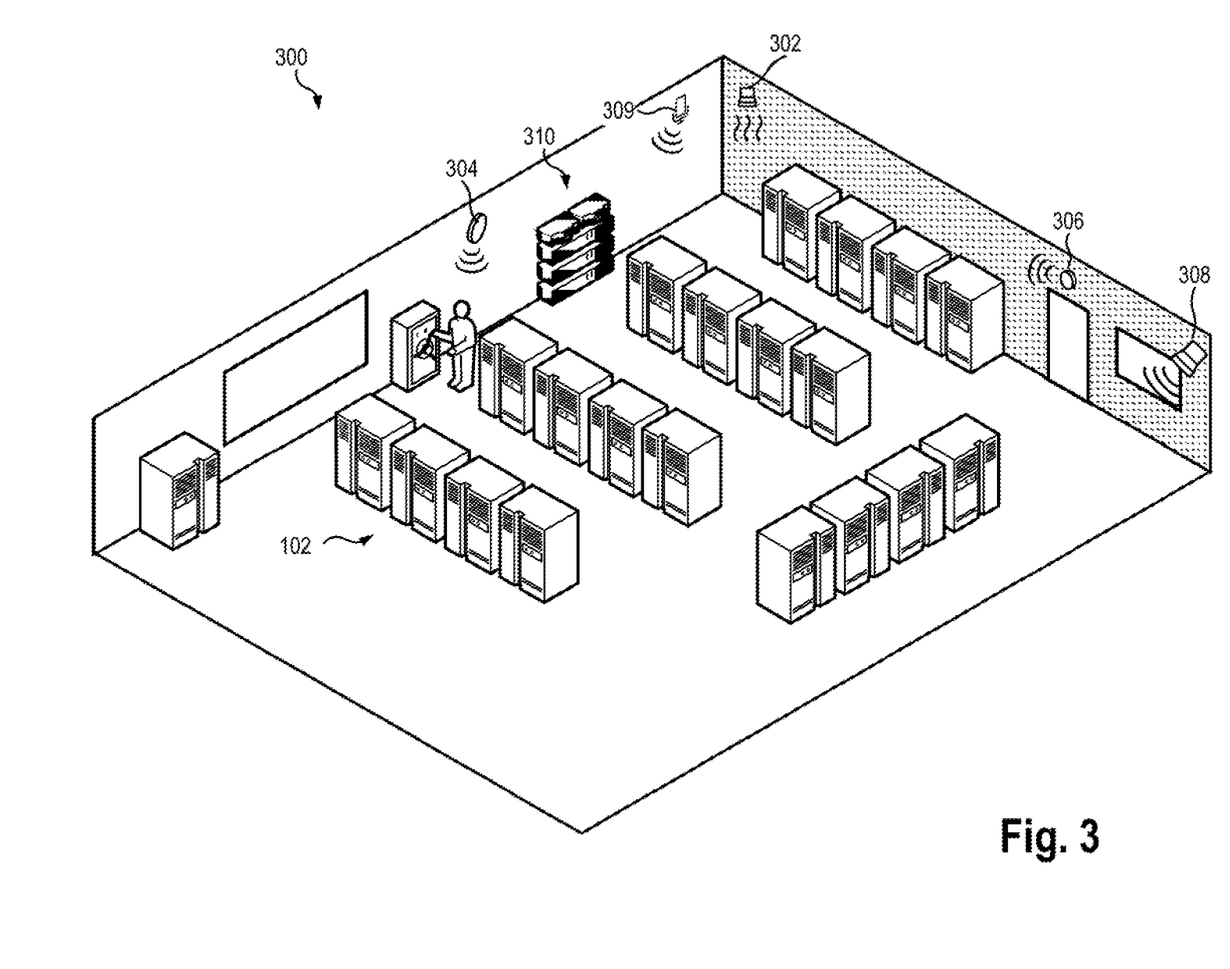
FIG. 3 is a diagram illustrating events occurring within an example data center according to an exemplary aspect.

FIG. 3 is a diagram illustrating events occurring within an example data center 300 according to an exemplary aspect. Although FIG. 3 depicts the data center 300 as a single server room in a perspective view, it is understood that a data center may include multiple server rooms, multiple floors, and even multiple sites. Disposed throughout the data center 300 are a plurality of external sensors and other devices that obtain physical and environmental data on the environment of the servers 102, networking equipment 310, and other equipment disposed in the data center. For example, the data center may include one or more temperature sensors 302 configured to generate real-time temperature readings within the data center, at specific locations within the data center, including proximate to particular servers. The data center may further include other sensors configured to generate environmental data related to the air within the server room, such as a humidity sensor. As shown, the data center 300 may include one or more smoke detectors 304, carbon dioxide detector, and other sensors related to fire detection, which perform air sampling and generate environment data specifying an amount of smoke indicators or an amount of carbon dioxide contained in the air. In some aspects, the data center 300 may include weather sensors disposed outside of the data center for detecting hazardous weather events (e.g., thunderstorms, floods, tornados, earthquakes, etc.) that may negatively affect the servers within the data center.

In an aspect, the data center 300 includes one or more motion sensors 306, surveillance video cameras 308, audio sensors 309, and other proximity sensors that may be used to detect the presence of persons within the server room. In some aspects, the motion sensors 306 may be disposed proximate to avenues of egress and ingress of the data center 300, such as doors and entryways, as well as proximate to particular servers. In other aspects, each door of the data center may include a sensor configured to detect when the door is opened or closed. Similarly, the racks containing the servers 102 may include sensors configured to detect when the front panels have been opened or accessed.

In some aspects, each server 102 may include a hardware monitoring device 122 configured to generate metrics and data related to the physical status and health of the system hardware 110 of the server. For example, the hardware monitoring device 122 can generate data indicating the voltage and power use of the system hardware, data related to the health and reliability of the storage device 116 (e.g., S.M.A.R.T. system), data relating to an internal temperature of the CPU 112, data relating to the fan speed and other cooling systems within the servers, etc.

In some aspects, the data center may further includes a network monitor 124 and other software security tools configured to detect anomalous or malicious network traffic and other malicious behavior of the interconnected servers 102. For example, the network monitor 124 may be configured to detect and generate log data indicating when a particular port on a networking interface of a server has been opened, or when a particular service has been accessed by an outside request, or a login action to a particular account on the server.

Figure 4:
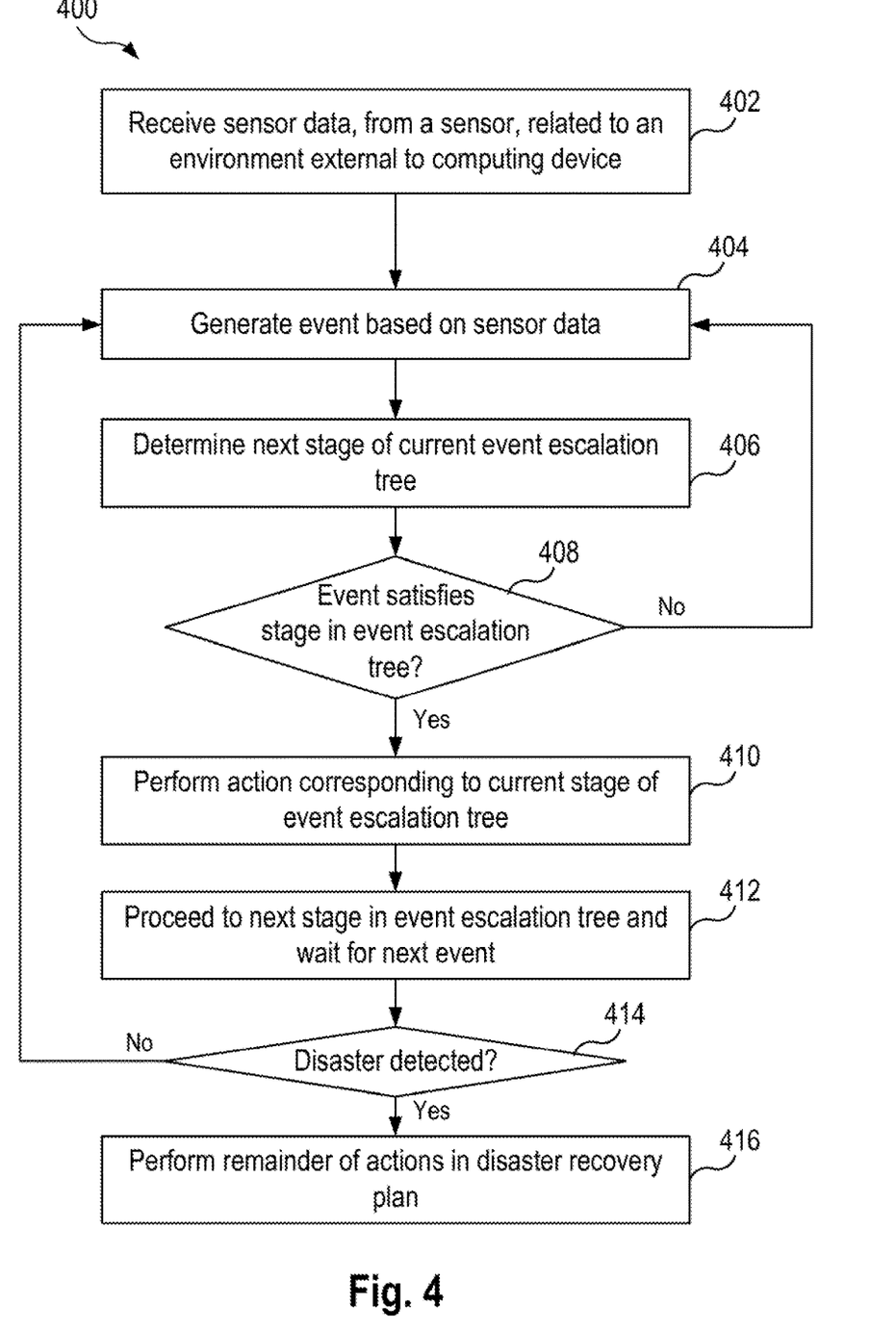
FIG. 4 is a flowchart illustrating a method for proactive disaster recovery according to an exemplary aspect.

FIG. 4 is a flowchart illustrating a method 400 for proactively performing disaster recovery according to an exemplary aspect. It is noted that the following description of the exemplary method makes reference to the system and components described above.

The method 400 begins at step 402, in which the system monitor 130 receives, from at least one of the sensor 120, data associated with an environment external to a first computing device (e.g., server 102) disposed in the data center. In some aspects, the data may be received from a plurality of sensor(s) disposed in the data center, such as a temperature sensor, a carbon dioxide sensor, a humidity sensor, a motion sensor, a smoke detector, and a surveillance video camera. In other aspects, the system monitor 130 may receive data associated with an environment external to the servers in the data center, from a variety of sources that are not limited to a sensor 120, such as public bulletins about forecasted or imminent weather reports of the area in which the data center is located, or alerts or log data from an internal network monitor communicatively connected to a communications network within the data center.

At step 404, the system monitor 130 generates an event based on the received sensor data. For example, a door-opened event may be generated based on sensor data from a motion detector stationed above a door in a server room. In some aspects, an event may be raised in response to determining that the sensor data exceeds certain threshold values. For example, a temperature-increasing event may be generated in response to receiving temperature data from a temperature sensor that exceeds a threshold temperature deviation for a duration longer than a threshold amount of time. In another example, a smoke-detected event may be generated in response to receiving smoke detector data indicating the smoke indicators in the sampled air exceeds a threshold content level (e.g., in parts per million).

At step 406, the system monitor 130 may determine a next stage of a current escalation tree 132 and at step 408, checks whether the generated event satisfies a condition of the next stage of the event escalation tree, i.e., is an escalated event. If no current escalation tree is being considered, the system monitor 130 may retrieve one or more pre-determined escalation trees having a first-in-sequence stage that satisfies the generated event. In some aspects, if multiple escalation trees match or are satisfied by the recent sequence of events, the system monitor may continue to quietly observe the actions until a single escalation tree matches the events, i.e., refrain from executing any actions specified by the escalation tree until all but one escalation tree are eliminated.

At step 410, responsive to determining that the first event satisfies the first condition of the event escalation tree, the backup system executes a corresponding action (as specified by the event escalation tree) on the server for preparing data stored in the server for disaster recovery. In some aspects, the corresponding action may include modification of the settings of the current backup policy in anticipation of a hardware or software failure occurring soon. For example, the backup system may increase a frequency of backups to decrease the RPO of the system. It is understood that the preparation action is performed prior to the system ever being in disaster recovery state. That is, the event escalation tree enables the backup system to perform recovery preparation actions based on an increasing likelihood that a disaster scenario is unfolding, as reflected by the sequence of escalating events.

If the first event does not satisfy the first condition, the system monitor may return to operations of step 404 and wait for a next event to be raised based on sensor data. In some aspects, the system monitor 130 may reset consideration of an event escalation tree upon expiry of a timer that represents a minimum amount of time between escalating events. For example, if a smoke-detected event is not found within a threshold time period (e.g., 3 hrs) of a temperature-increasing event, the system monitor may discard the temperature-increasing event from consideration. In other aspects, the system monitor may calculate a time period between possible escalated events, and may use that time period for calculating a relevancy weight that influences whether an event is deemed escalating.

In one approach to disaster recovery, one of the backups 134 is converted to a virtual machine disk (i.e., "convert to VM" approach), and then stored in the backup servers of a failover or recovery system. At the time when an application 105 needs to failover to this converted VM, the converted VM may be simply powered on. This approach may require a significant amount of storage resources, as a full copy of a virtual machine disk files (e.g., VHD or VMDK files) must be maintained in storage. In some aspects, the backup system 104 may include a "cold" storage system that uses data storage techniques and media (e.g., tape drives) having a lower cost per unit storage that is suitable for storing infrequently accessed data, at the expense of data retrieval and response times. The backup system 104 may store such converted VMs in cold storage and, when needed, move the VM disks and/or backup files to a "warm" or "hot" storage system, which uses higher performance data storage techniques and media (e.g., solid state drives). Typically, the network resources and time used to transfer a converted VM to the hot storage system may delay the recovery of a critical application. Using aspects of the present disclosure, the backup system 104 may proactively begin the process of transferring a converted VM and/or other backup files from a cold storage system to a warm or hot storage system in response to determining that an escalated stage of the event escalation tree is satisfied by the generated first event.

In another approach to disaster recovery, the backup system may proactive begin the process of running a VM from a backup archive 134, which includes emulating a virtual disk using a backup archive. It is noted that, in order to start the guest OS on a mounted VM, restore-preparation algorithms must be executed. Applying these restore algorithms may take significant time, since the VM disks are emulated from the backup archive, and thus have limited IOPS (input/output operations per second), which further slows down application of the restore algorithms. For example, the restore-preparation process may include the addition or modification of at least one device driver in the virtual disk, the patching of a system boot loader, conversion of disks from MBR (master boot record) format to EFI (if needed). An example restore-preparation process may be Acronis Universal Restore™ technology found in Acronis Backup® made available by Acronis International GmbH. Using aspects of the present disclosure, the backup system may proactively begin the process of running a VM from a backup archive by, for example, pre-provisioning VMs and/or networks in the backup system for use in the disaster recovery.

At step 412, the system monitor 130 may proceed to a next stage in the event escalation tree and wait for a next event to occur. That is, the system monitor 130 may "navigate" to a next branch or stage in the event escalation tree and identify the conditions or events required to satisfy that next stage.

At step 414, the system monitor 130 may check whether any disaster situations or conditions (e.g., hardware or software failures) have been detected within the data center. If so, then at step 416, the backup system 104 proceeds to perform a remainder of the disaster recovery operations to failover the servers to a recovery system.

In one example, in response to determining a series of escalating events indicative of a fire accident being detected in an adjacent room, or unit, or office, the proactive disaster recovery system stops the existing servers and runs their replicas on a cloud environment or on a remote virtual server.

In another example, the backup system may proactively perform disaster recovery operations based on an event escalation tree representing unauthorized or malicious access over the computer network to servers in the data center. First, in response to detecting a series of escalating events indicative of suspicious or anomalous activity in the network, the backup system performs a sequence of actions to protect any private data contained in the servers 102. Responsive to an escalating series of events include port scanning or usage from an outside network and detection of an attempt to break a user password, the backup system may perform a corresponding action of removing or dropping all secure password or keys which were decrypted at the moment from computer memory. Then at a next stage, responsive to detecting an escalating event of a user login to an account at an anomalous time, the backup system may then break all client or user connections to a given server or computer. Finally, the backup system may block the server or computer and destroy all critical data contained on the server.

In another example, the backup system may proactively perform disaster recovery operations based on an event escalation tree indicative of unauthorized physical access at the data center. First, the backup system may match a first-in-sequence event of an event escalation tree based on motion detection in the hallway of a server during a lockeddown period (e.g., armed security system). Then, responsive to matching an escalated event comprised of detected motion near a particular server (i.e., Server-1), the backup system may proactively prepare to drop all critical data from the hard disk drive of the server, e.g., by migration of the service to another server in another hall or room. Finally, in response to matching a final escalating event of the detection of the opening of the server rack and an initiation of a hot-removal of a hard disk drive, the backup system may proactively execute a migration and clean all critical data on the server and hard disk drive.

Figure 5:
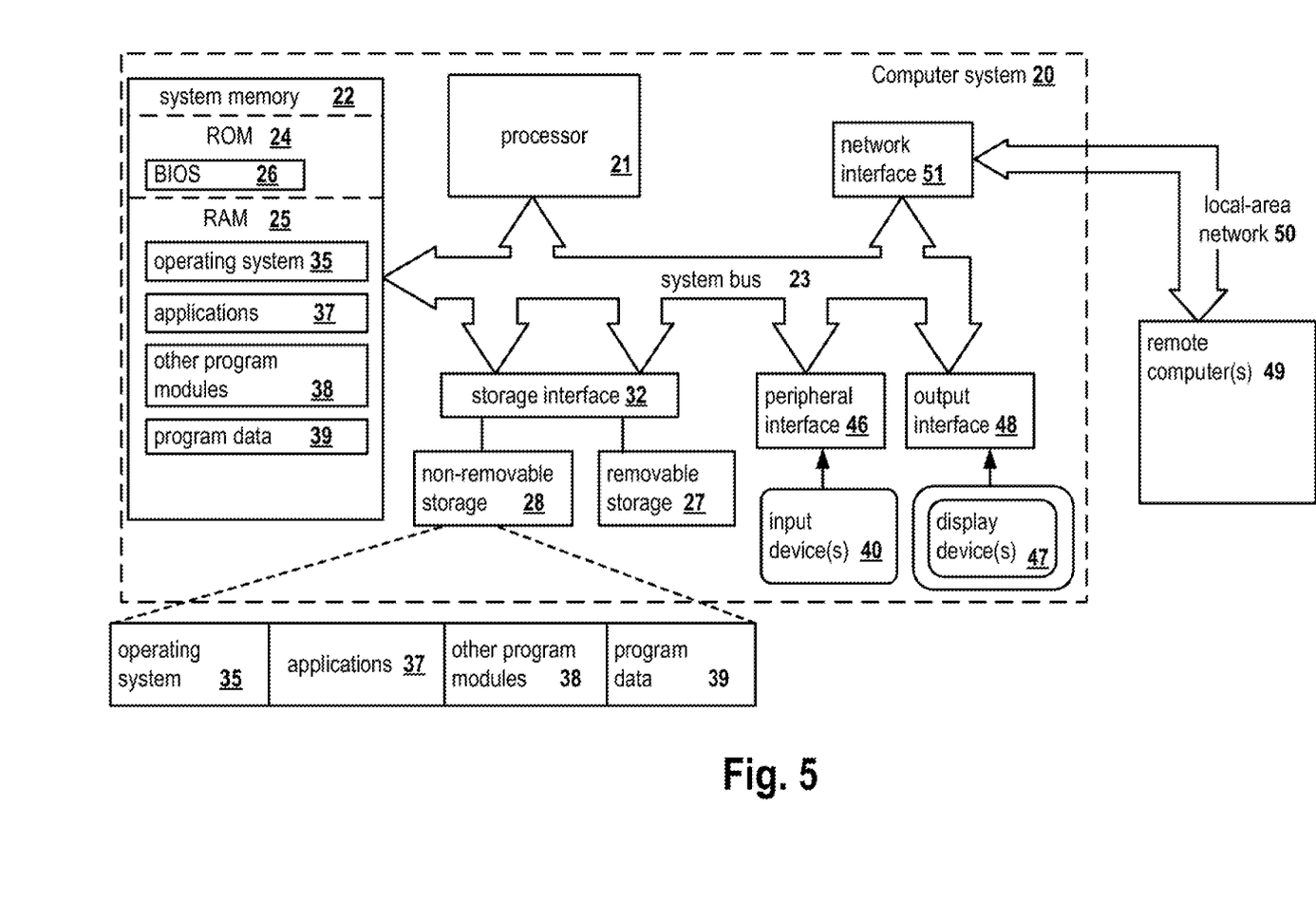
FIG. 5 is a block diagram of a computer system on which the disclosed system and method can be implemented according to an exemplary aspect.

FIG. 5 is a block diagram illustrating a computer system 20 on which aspects of systems and methods for proactively performing disaster recovery may be implemented in accordance with an exemplary aspect. It should be noted that the computer system 20 can correspond to the physical servers 102 and backup system 104, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for proactive disaster recovery preparation, the method comprising:
   detecting, based on sensor data received from a sensor in a first area of a data center, a first event that is a potential threat in data loss or breach at a server in the first area, wherein the sensor data captures an attribute of an environment proximate to the server;
   identifying, from a plurality of event escalation trees, an event escalation tree comprising the first event, wherein each respective event escalation tree defines a unique sequence of events and a respective action of a disaster recovery preparation process to execute for each respective event, and wherein events of the identified event escalation tree indicate a progression of the potential threat to additional areas in the data center and corresponding actions to the events indicate transferring data from servers in areas where the potential threat is detected to servers in other areas within the data center where the potential threat is not detected; and
   responsive to detecting the events at the data center sequentially ordered in accordance with the identified event escalation tree, sequentially executing the corresponding actions of the disaster recovery preparation process.

2. The method of claim 1, wherein the server is a first server, and wherein sequentially executing the corresponding actions comprises:
   transferring, at a first time, at least one portion of data stored on the first server in the first area of the data center to a second server in a second area of the data center where the potential threat is not detected;
   detecting, at a subsequent time, that the potential threat is progressing towards the second area; and
   in response to detecting that the potential threat is progressing towards the second area, transferring the at least one portion of data from the second server in the second area to a third server in a third area of the data center where the potential threat is not detected.

3. The method of claim 2, wherein the potential threat progressing towards the second area is indicated in a second event of the identified event escalation tree.

4. The method of claim 3, wherein the first event is associated with a first severity grade indicative of a likelihood of the first event triggering the data loss or breach at the server, the second event is associated with a second severity grade that is greater than the first severity grade, and wherein an amount of server resources utilized for each respective action is correlated with a respective severity grade of the respective event.

5. The method of claim 2, wherein the potential threat is an unauthorized person that has infiltrated the data center to potentially steal the at least one portion of data and the sensor comprises one or more of a motion detector and a surveillance video camera.

6. The method of claim 2, wherein the potential threat can cause physical damage to the first server in the first area, leading to the data loss or breach, and wherein the sensor comprises one or more of a temperature sensor, a carbon dioxide sensor, a humidity sensor, and a smoke detector.

7. The method of claim 2, further comprising:
detecting that the potential threat has caused the data loss or breach at the first server in the first area;
uploading data stored in the servers in the other areas within the data center where the potential threat is not detected to servers in a different data center; and
shutting down the servers in the other areas.

8. The method of claim 1, wherein sequentially executing corresponding actions comprises:
executing a first action corresponding to the first event in the event escalation tree;
monitoring subsequent sensor data for a next event directly after the first event in the event escalation tree; and
responsive to detecting the next event, executing a next action corresponding to the next event.

9. The method of claim 8, wherein the first action comprises removing all secure passwords and keys from the server, the next action comprises breaking all client and user connections to the server, and a subsequent action corresponding to a subsequent event comprises deleting data classified as critical on the server.

10. The method of claim 8, wherein the identified event escalation tree further defines a maximum time period between the first event and the next event, further comprising:
monitoring the subsequent sensor data for the next event within the maximum time period; and
in response to determining that the next event has not occurred within the maximum time period, identifying a different event escalation tree from the plurality of event escalation trees that comprises the first event.

11. A system for proactive disaster recovery preparation, the system comprising:
a plurality of sensors including a sensor in a first area of a data center, the sensor configured to provide sensor data that captures an attribute of an environment proximate to a server in the first area;
a hardware processor configured to:
detect, based on the sensor data received from the sensor, a first event that is a potential threat in data loss or breach at a server in the first area;
identify, from a plurality of event escalation trees, an event escalation tree comprising the first event, wherein each respective event escalation tree defines a unique sequence of events and a respective action of a disaster recovery preparation process to execute for each respective event, and wherein events of the identified event escalation tree indicate a progression of the potential threat to additional areas in the data center and corresponding actions to the events indicate transferring data from servers in areas where the potential threat is detected to servers in other areas within the data center where the potential threat is not detected; and
responsive to detecting the events at the data center sequentially ordered in accordance with the identified event escalation tree, sequentially execute the corresponding actions of the disaster recovery preparation process.

12. The system of claim 11, wherein the server is a first server, and wherein the hardware processor is configured to sequentially execute the corresponding actions by:
transferring, at a first time, at least one portion of data stored on the first server in the first area of the data center to a second server in a second area of the data center where the potential threat is not detected;
detecting, at a subsequent time, that the potential threat is progressing towards the second area; and
in response to detecting that the potential threat is progressing towards the second area, transferring the at least one portion of data from the second server in the second area to a third server in a third area of the data center where the potential threat is not detected.

13. The system of claim 12, wherein the potential threat progressing towards the second area is indicated in a second event of the identified event escalation tree.

14. The system of claim 13, wherein the first event is associated with a first severity grade indicative of a likelihood of the first event triggering the data loss or breach at the server, the second event is associated with a second severity grade that is greater than the first severity grade, and wherein an amount of server resources utilized for each respective action is correlated with a respective severity grade of the respective event.

15. The system of claim 12, wherein the potential threat is an unauthorized person that has infiltrated the data center to potentially steal the at least one portion of data and the sensor comprises one or more of a motion detector and a surveillance video camera.

16. The system of claim 12, wherein the potential threat can cause physical damage to the first server in the first area, leading to the data loss or breach, and wherein the sensor comprises one or more of a temperature sensor, a carbon dioxide sensor, a humidity sensor, and a smoke detector.

17. The system of claim 12, wherein the hardware processor is further configured to:
detect that the potential threat has caused the data loss or breach at the first server in the first area;
upload data stored in the servers in the other areas within the data center where the potential threat is not detected to servers in a different data center; and
shut down the servers in the other areas.

18. The system of claim 11, wherein the hardware processor is further configured to sequentially execute the corresponding actions by:
executing a first action corresponding to the first event in the event escalation tree;
monitoring subsequent sensor data for a next event directly after the first event in the event escalation tree; and
responsive to detecting the next event, executing a next action corresponding to the next event.

19. The system of claim 18, wherein the first action comprises removing all secure passwords and keys from the server, the next action comprises breaking all client and user connections to the server, and a subsequent action corresponding to a subsequent event comprises deleting data classified as critical on the server.

20. A non-transitory computer readable medium comprising computer executable instructions for proactive disaster recovery preparation, including instructions for:
detecting, based on sensor data received from a sensor in a first area of a data center, a first event that is a potential threat in data loss or breach at a server in the first area, wherein the sensor data captures an attribute of an environment proximate to the server;

identifying, from a plurality of event escalation trees, an event escalation tree comprising the first event, wherein each respective event escalation tree defines a unique sequence of events and a respective action of a disaster recovery preparation process to execute for each respective event, and wherein events of the identified event escalation tree indicate a progression of the potential threat to additional areas in the data center and corresponding actions to the events indicate transferring data from servers in areas where the potential threat is detected to servers in other areas within the data center where the potential threat is not detected; and responsive to detecting the events at the data center sequentially ordered in accordance with the identified event escalation tree, sequentially executing the corresponding actions of the disaster recovery preparation process.

\* \* \* \* \*